Nov. 28, 1967   A. R. CRIPE   3,355,210
BAGGAGE RACK ASSEMBLY
Filed Dec. 28, 1965   2 Sheets-Sheet 2

United States Patent Office 3,355,210
Patented Nov. 28, 1967

3,355,210
BAGGAGE RACK ASSEMBLY
Alan R. Cripe, Richmond, Va., assignor to United Aircraft Corporation, East Hartford, Conn., a corporation of Delaware
Filed Dec. 28, 1965, Ser. No. 516,899
1 Claim. (Cl. 296—28)

ABSTRACT OF THE DISCLOSURE

A hollow passenger vehicle overhead baggage rack with integral exhaust ducting to remove a large volume of contaminated air at a reduced noise level from the interior of the vehicle, the rack having a lighting fixture facing the vehicle wall to provide indirect lighting of the vehicle interior, the front edge of the rack containing downwardly directed passenger reading lights.

---

This invention relates to improvements in overhead baggage racks for passenger vehicles.

In the design of modern transportation equipment there is an increasing tendency to adapt the various appointments in the interior of the vehicle to the performance of more than one function. This is especially true in the manufacture of lightweight ground transportation wherein considerable reliance is placed upon the design experience and techniques utilized in the aircraft industry. A considerable space and weight saving can usually be realized through the incorporation of light fixtures, their associated electrical wiring and other components within an existing baggage rack structure, since no additional conduit or support is required. In addition to the space and weight economies achieved by such techniques, overall fabrication and assembly costs are usually reduced and the foregoing economies are provided in an attractive and easily maintained package.

It is an object of the present invention to provide a baggage rack construction with integral exhaust ducting whereby smoke and contaminated air are readily removed from the interior of a vehicle near its source and prior to any extensive circulation of the contaminants to other sections of the vehicle.

It is a further object of this invention to provide adequate exhaust means for the interior of a passenger vehicle in a lightweight, attractive assembly.

A still further object is to provide a baggage rack construction which performs a plurality of functions, thereby lessening the complexity required in the structure of the vehicle body and providing substantial savings in fabrication and assembly costs.

An additional object is to provide an exhaust system of substantial cross-sectional area wherein a large volume of air is moved at low velocity to reduce the noise level associated with the operation of such a system.

Another object is to generally improve the construction of baggage racks for lightweight passenger vehicles.

These and other objects and advantages of the invention will be set forth in the following description or will be evident therefrom or from practice of the invention which can best be described by reference to the preferred embodiment shown in the drawings of which:

Described broadly, the present invention may be seen to comprise a hollow baggage rack, the upper surface being used to support luggage in the usual fashion and the hollow interior being used to exhaust contaminated air from the interior of a vehicle at low velocity, and for miscellaneous other functions such as light fixturing. Accordingly, smoke and contaminated air may be readily exhausted from the vehicle interior near its point of generation and before it has begun to circulate. Additionally, individual and versatile lighting may be readily provided for the convenience of the passengers. Further, changes in the interior arrangement of the vehicle may be readily accommodated by simple changes in the baggage rack and without substantial alterations to the structure of the vehicle itself. Because various sections of the baggage rack may be preassembled, installation and maintenance is simplified, since worn or damaged sections may be readily replaced with minimum effort.

Figure 1:
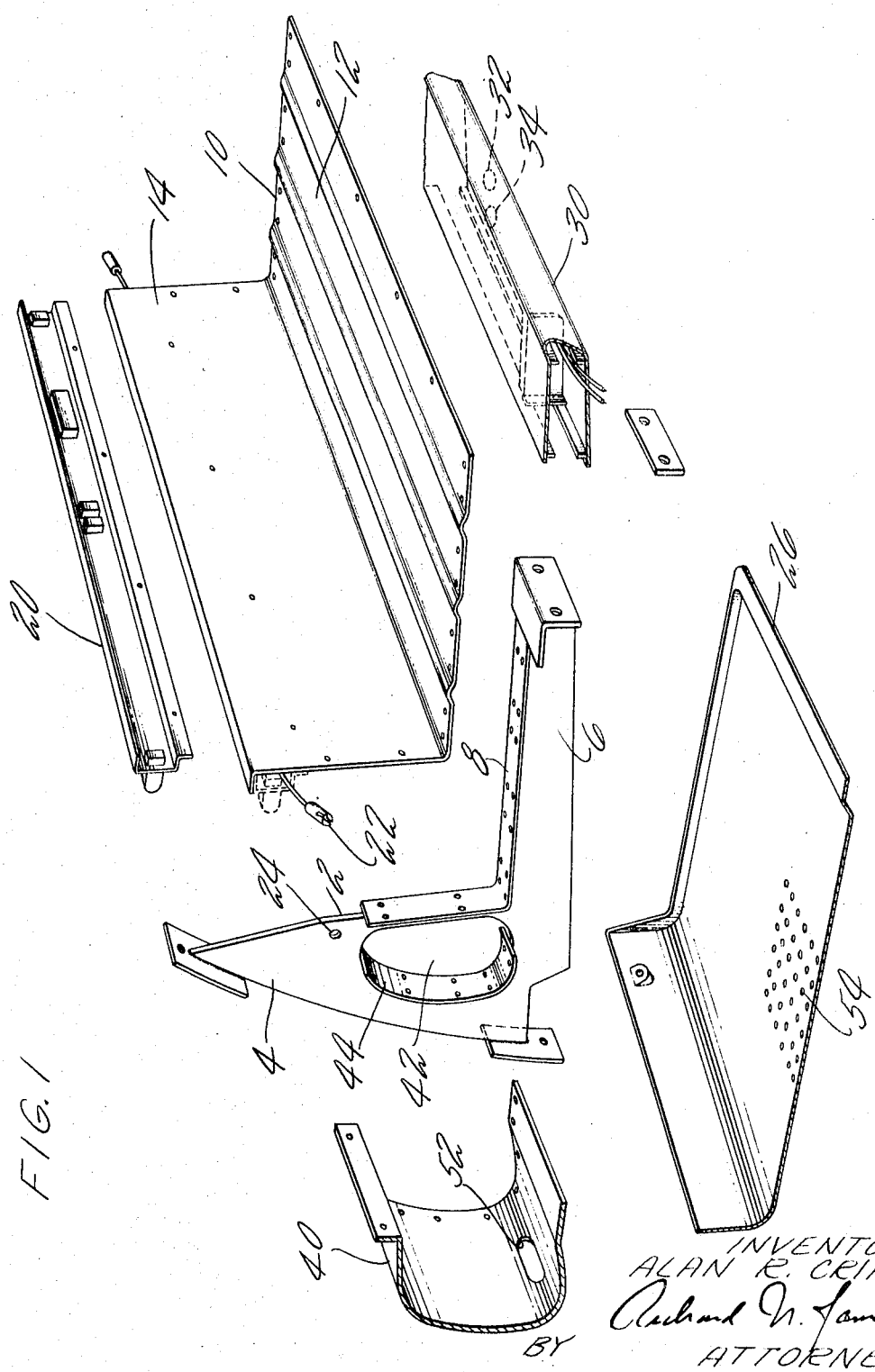
FIG. 1 is an exploded view of a preferred embodiment of the improved baggage rack structure.
Figure 2:
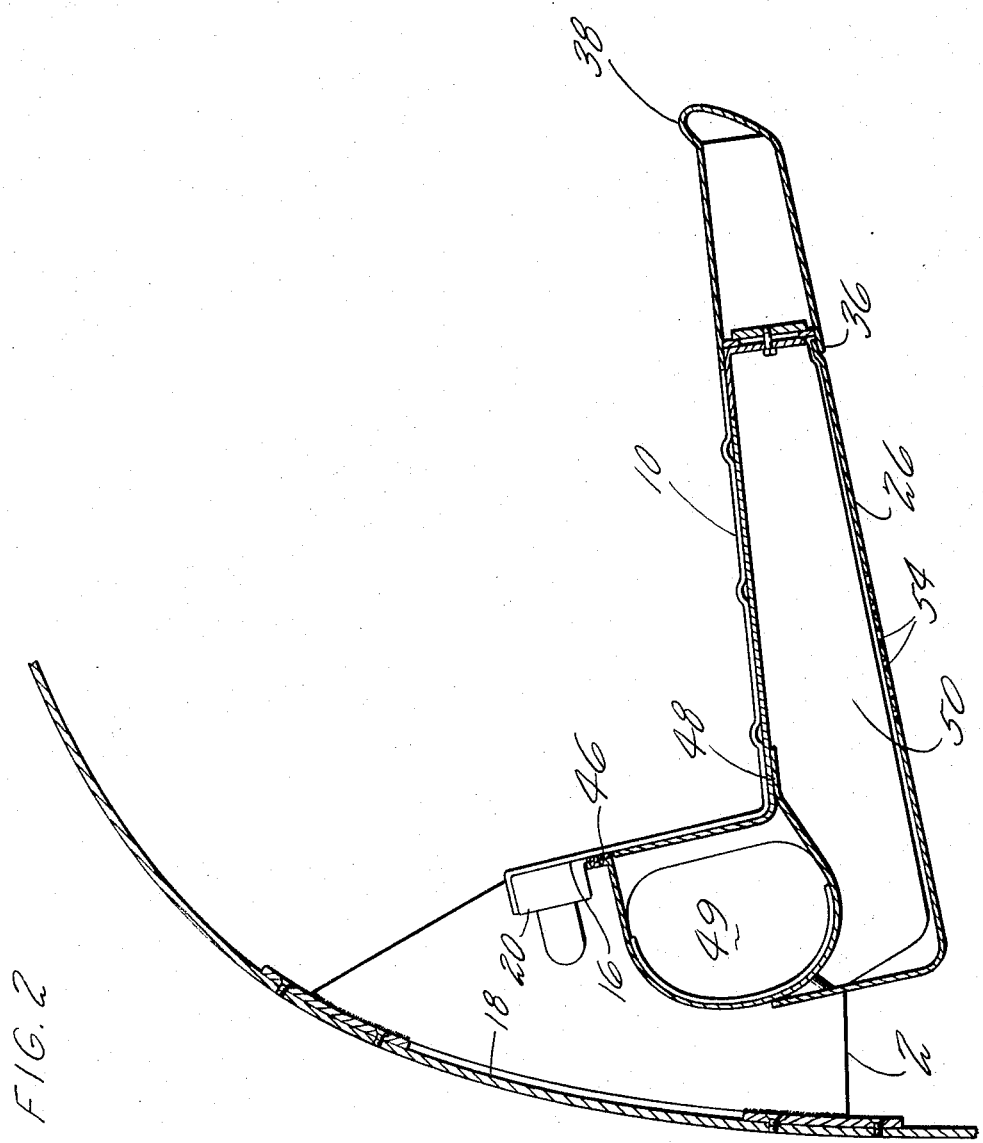
FIG. 2 is a cross-sectional view of the baggage rack of FIG. 1 taken parallel to the axis of a vehicle and illustrating the rack mounted on the wall thereof.

Referring now to the embodiment of FIGS. 1 and 2, it will be seen that angular mounts 2 are provided, only one of which is shown, each of the mounts having an upwardly directed portion 4 and an outwardly directed portion 6. A sheet supporting flange 8 integral with the mount 2 is provided along a section of the upper edge of the mount to furnish a connecting surface for the top sheet 10 upon which the luggage is placed.

The top sheet 10 is adapted to conform substantially to the contour of the mount to form a support section 12 and a back retention section 14. The section 12 of the sheet is preferably fluted to increase its rigidity, since it is the weight-carrying portion of the sheet and must extend unsupported between adjacent mounts positioned in longitudinally spaced locations along the length of the vehicle. Peripheral holes provided in the top sheet mate with corresponding holes provided in its supporting member to facilitate standard nut-and-bolt connections therebetween.

In the particular embodiment shown, the angular mount is formed with a web section of sufficient width to provide a substantial space between the inner side 16 of the top sheet and the vehicle wall 18. A light fixture 20 is conveniently attached to the top sheet in this space to furnish indirect lighting to the interior of the vehicle. Electrical connections between adjacent baggage rack sections are made by means of suitable electrical plugs 22 which are adapted to be passed through an opening 24 provided in the angular mount.

A perforated sheet 26 is attached to the bottom of the respective mounts and bridges the space therebetween. Since it is not a load carrying member, it need possess only sufficient rigidity to be self-supporting over the space between the mounts. As shown, it is not perforated over its entire surface but in selective areas which correspond in the installed rack to the longitudinal spacing of the passenger seats. The total developed cross-sectional area of the openings in the perforated sheet is sufficient to eliminate any noise problem associated with the passage of exhaust air into the interior of the assembly.

A hollow longitudinally extending beam 30 is provided along the outer edge of the baggage rack, the beam being connected to the free ends of the respective mounts and forming a closure for one edge of the space provided between the top sheet and the perforated sheet. It additionally carries individual passenger reading lights 32 and 34 of the aircraft type and their associated wiring, the lights being regularly spaced along the length of the beam in accordance with the particular seating arrangement utilized. It is formed with sufficient rigidty to withstand the anticipated rigors associated with the passage of baggage thereover and is utilized to retain one edge of the perforated sheet, as most clearly seen in FIG. 2 at 36. A small upturned portion 38 at its outer end serves as a baggage retention stop.

Each of the angular mounts 2 is provided with an opening 42 therein to which duct closure members 40 are conveniently attached, the opening 42 forming part of the exhaust duct. The member 40 is connected to an arcuate flange within the opening in the mounts and is further connected to the back and bottom of the baggage rack at 46 and 48 to form the exhaust duct 49. It will be seen that the combination of the closure member 40, beam 30, top sheet 10, and perforated sheet 26 forms an exhaust chamber 50 of substantial volume internal of the baggage rack structure. Access 52 is provided in the closure member 40 between the exhaust duct 49 and the exhaust chamber 50, and thence through the openings 54 in the perforated sheet 26 into the vehicle interior. Sufficient developed cross-sectional area is provided in the duct and in all air passageways to reduce the effects of air flow past the openings to an inaudible level.

While this invention has been described in connection with a particular preferred embodiment, various modifications will be evident to those skilled in the art within the scope of the appended claim.

What is claimed is:

A passenger vehicle overhead baggage rack with integral exhaust ducting comprising:

a plurality of angular mounts for affixing the baggage rack to the wall of the vehicle, each of the mounts including an upwardly directed portion adjacent the vehicle wall and an outwardly directed portion extending toward the interior of the vehicle, each of the angular mounts having an opening therethrough;

a longitudinal beam affixed to the free ends of the outwardly directed portions of the respective mounts;

a top sheet of substantial rigidity athwart the mounts and connected thereto for supporting baggage, the top sheet being formed to substantially conform to the upper surface of the angular mounts to which it is connected, the upwardly directed portion of the top sheet being spaced a substantial distance from the inner wall of the vehicle;

a perforated sheet affixed to the bottom of the respective mounts and extending therebtween;

a closure member affixed to the inner side of the baggage rack to form an exhaust duct integral therewith, the closure member being attached to the opening in the angular mount, the opening forming part of the exhaust duct and providing communication therefor between adjacent baggage rack sections, the combination of the closure member, beam, top sheet and perforated sheet defining an exhaust chamber internal of the baggage rack, the exhaust duct being provided with access to the exhaust chamber to permit air from the vehicle interior to be drawn into the exhaust duct through the openings in the perforated sheet and through the exhaust chamber;

and a light fixture attached to the baggage rack in the space provided between the top sheet and the vehicle wall to furnish indirect lighting to the interior of the vehicle.

References Cited
UNITED STATES PATENTS

| | | | |
|---|---|---|---|
| 2,250,619 | 7/1941 | Austin | 296—28 |
| 2,264,637 | 12/1941 | Landell | 224—29.5 |
| 2,615,115 | 10/1952 | Watter | 105—329 X |
| 2,779,862 | 1/1957 | Eichner | 224—29.5 X |
| 2,779,864 | 1/1957 | Eichner | 224—29.5 X |

BENJAMIN HERSH, *Primary Examiner.*

J. A. PEKAR, *Assistant Examiner.*